Oct. 23, 1951 P. H. SMITH 2,572,672

IMPEDANCE TRANSFORMING NETWORK

Filed May 6, 1947 3 Sheets-Sheet 1

INVENTOR
P. H. SMITH
BY N. D. Ewing
ATTORNEY

INVENTOR
P. H. SMITH
BY N. S. Ewing
ATTORNEY

Oct. 23, 1951 P. H. SMITH 2,572,672

IMPEDANCE TRANSFORMING NETWORK

Filed May 6, 1947 3 Sheets-Sheet 3

INVENTOR
P. H. SMITH
BY N. S. Ewing
ATTORNEY

Patented Oct. 23, 1951 2,572,672

UNITED STATES PATENT OFFICE 2,572,672

IMPEDANCE TRANSFORMING NETWORK

Phillip H. Smith, Fair Haven, N. J., assignor to Bell Telephone Laboratories, Incorporated, New York, N. Y., a corporation of New York Application May 6, 1947, Serial No. 746,338

2 Claims. (Cl. 178—44)

This invention relates to impedance transformer circuits utilizing transmission line stub reactors.

An object of this invention is to match the characteristic impedance of a transmission line to a wide range of load impedances.

A feature of the invention relates to the impedance transforming characteristics of line stub circuits, wherein the stubs are variable in length over a full half wavelength.

Another feature of the invention relates to matching of load impedances to a transmission line characteristic impedance by means of two spaced coaxial line stub reactors, variable in length and interconnected by a section of line having a fraction of the characteristic impedance of the line to which the transformer is connected.

Referring to the figures of the drawing.

Figures 1, 2B:
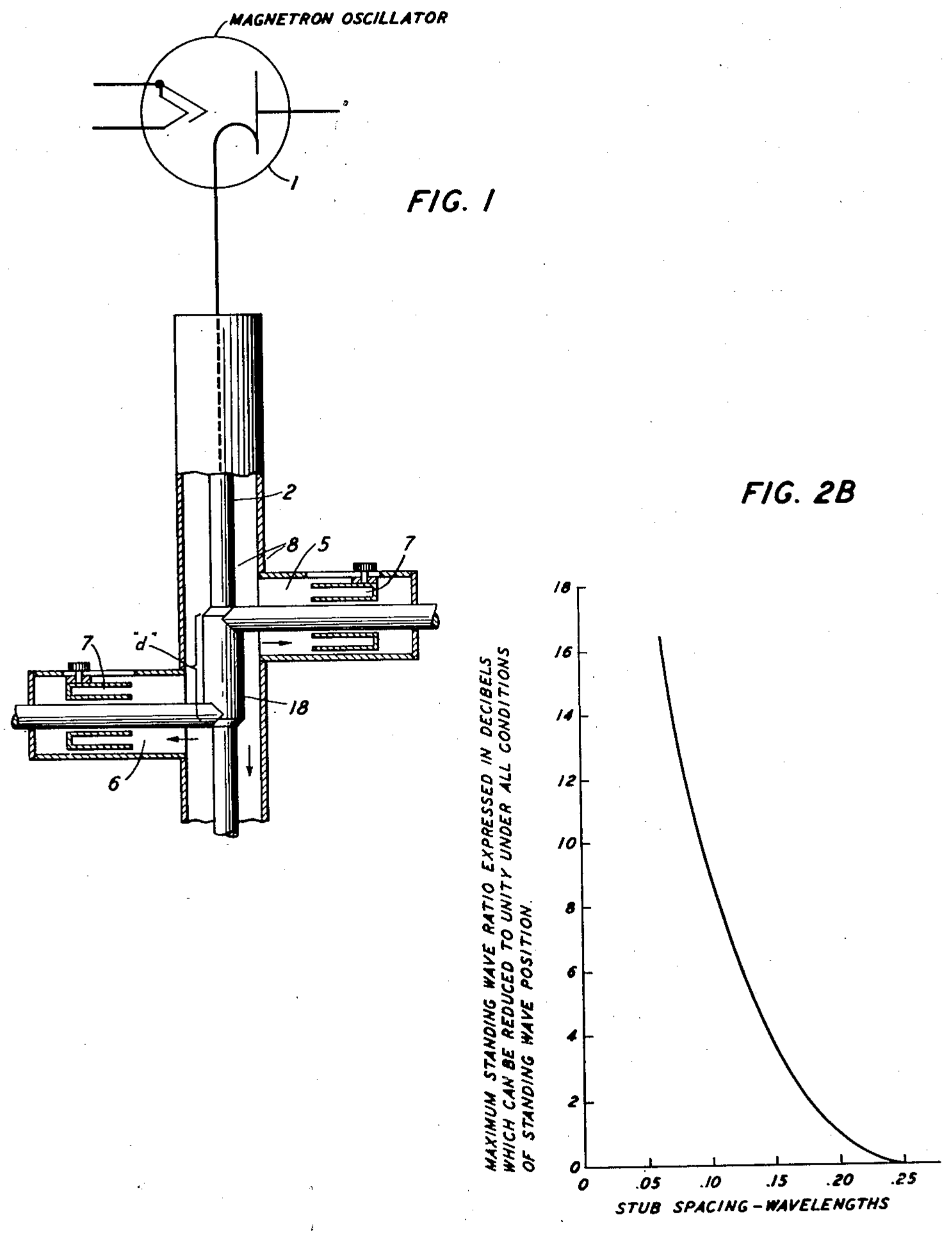
Fig. 1 shows schematically a radio frequency transmitter and coaxial transmission line output circuit.
Fig. 2B is a graph associated with the network of Fig. 2.

Referring to Fig. 1, a magnetron oscillator 1 provides radio frequency energy for propagation over a coaxial transmission line 2 of uniform characteristic impedance $Z_0$ to an antenna assembly (not shown). The antenna may be a radiating element such as a dipole which is rotated about the axis of a paraboloidal reflector in the focal plane thereof as disclosed in the United States patent application of P. H. Smith, Serial No. 498,622, filed August 14, 1943, which issued as United States Patent No. 2,542,844 February 20, 1951. The antenna impedance is matched to the characteristic impedance of the main transmission line at the antenna.

To match the impedance of the magnetron 1 to that of the coaxial transmission line 2, a pair of tuning stub sections 5 and 6 are provided in shunt with the coaxial transmission line 2 and spaced apart a distance "*d*." Each stub section 5 and 6 comprises an inner and outer conductor three-quarter wavelengths or more in over-all length and a one-quarter wavelength long trap form of tuning plunger 7 therebetween. The plunger 7 and its operation, which are more fully disclosed in the aforementioned United States patent of P. H. Smith, is adjustable along the length of the stub, providing thereby an effective half wavelength variation of stub length for electrical tuning.

The position of the tuning plungers 7 on stubs 5 and 6 is adjusted to the point where the magnetron delivers maximum energy to transmission line 2. This occurs when the transformer network comprised of stubs 5 and 6 and the interconnecting section "*d*" provides a match between the magnetron and the transmission line impedances.

The interconnecting series branch 18 (length "*d*") of the impedance transforming network aforementioned, comprises a concentric line section whose inner conductor has an enlarged diameter with respect to the diameter of the inner conductor of the main transmission line to provide a lower characteristic impedance for this section of line. Alternatively, to provide an enlarged diameter, a slug or sleeve may be slid over the inner conductor of line 2 and moved into position between stubs 5 and 6. A lowering of the characteristic impedance of the section 18 may also be achieved by reducing the inside diameter of the outer conductor.

Figures 2, 2A:
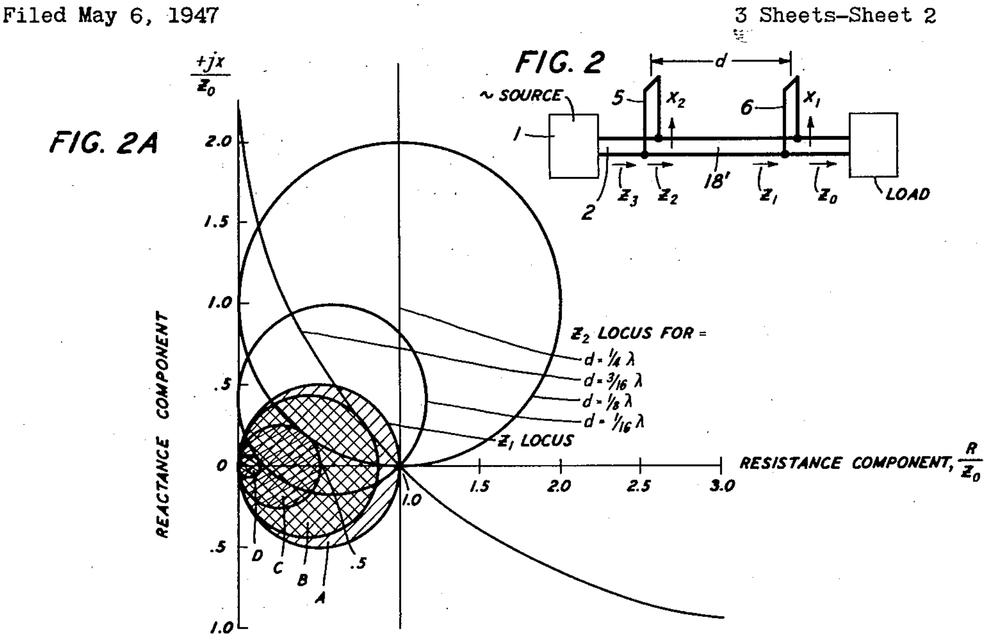
Fig. 2 shows an impedance transforming or matching network formed of parallel wire transmission lines.
Fig. 2A shows an impedance circle diagram related thereto.

Fig. 2 shows schematically an impedance transforming network, wherein coaxial stubs 5 and 6 are shunt connected to a coaxial line and spaced apart therealong a distance *d*, which represents the interconnecting series branch 18 of the network. The line section 18 of the network disclosed in Fig. 2 however, has a characteristic impedance equal to that of the main line 2. $Z_3$ represents the impedance looking into the network, $X_2$ the operating impedance of the stub 5, $X_1$ the operating impedance of stub 6, and $d$ the spacing of the stubs in wavelengths. $Z_0$ represents the load impedance.

Fig. 2A shows by an impedance circle diagram the relationship between the stub spacing "$d$" and impedance transforming capability. The impedance transforming capability is represented thereon as the entire area of the coordinate system exclusive of the cross-hatched forbidden areas which overlap one another, for various spacings $d$. Fig. 2A applies where stubs 5 and 6 shunt an interconnecting transmission line 18 having the same characteristic impedance $Z_0$ as that of the main line. While Figs. 2 and 2A are shown for a two-wire "balanced" transmission line they apply also to an "unbalanced" line such as a coaxial line.

The family of "forbidden" impedance areas shown on Fig. 2A are functionally related to the stub spacing expressed in wavelengths. The forbidden area, outlined by circle A, corresponds to $$\frac{d}{\lambda}=\frac{1}{4}, \frac{3}{4} \text{ etc.}$$

The forbidden area outlined by circle B, corresponds to $$\frac{d}{\lambda}=\frac{3}{16}, \frac{7}{16} \text{ etc.}$$

The forbidden area outlined by circle C, corresponds to $$\frac{d}{\lambda}=\frac{1}{8}, \frac{3}{8} \text{ etc.}$$

The forbidden area outlined by circle D, corresponds to $$\frac{d}{\lambda}=\frac{1}{16}, \frac{5}{16}, \text{ etc.}$$

These forbidden impedance areas, which are shown cross-hatched, represent impedance values which are not obtainable at the input terminals for $Z_3$ by any stub adjustment when the system is terminated in the impedance $Z_0$ (or vice versa).

Figures 3, 3A:
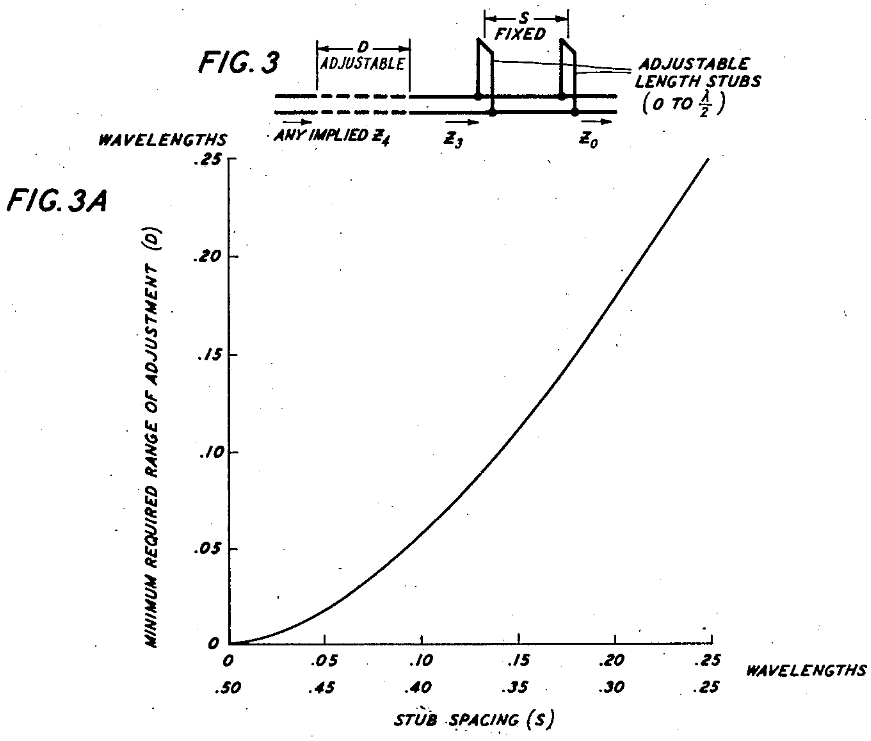
Fig. 3 is another transmission line impedance transforming circuit.
Fig. 3A is an explanatory graph therefor.

A modified network is shown in Fig. 3. The impedance transforming capability here is extended over that shown in Fig. 2 by avoiding the forbidden areas so that impedance values comprised therein at $Z_3$ may be obtained at $Z_4$. As shown in Fig. 3, a certain added minimum adjustable length of line D is inserted between $Z_3$ and $Z_4$, the point at which it is desired to have the transformation take effect. The specific minimum added length of line required for this accomplishment depends upon the stub spacing, as indicated by the curve of Fig. 3A. The maximum added line length which can be tolerated without causing $Z_4$ to again fall within the same forbidden area is one-half wavelength minus the minimum length shown on Fig. 3A.

Figures 4, 4A:
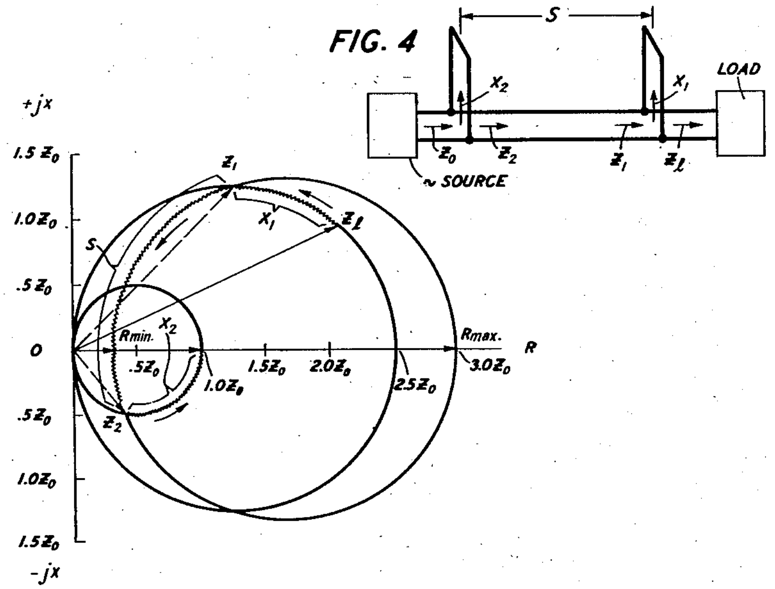
Fig. 4 is a modified circuit similar to Fig. 2.
Fig. 4A is a vector representation of the operation of the two-stub matching system shown in Fig. 4.

The network illustrated in Fig. 4 is similar to that of Fig. 2, except that the conditions of the problem are reversed for easier graphical analysis of the network operation. The fixed load impedance $Z_0$ of Fig. 2 is represented at the input terminals of the network of Fig. 4 and the variable range of input impedance $Z_3$ of the network of Fig. 2 is represented as the load of the network of Fig. 4.

Fig. 4A shows how the two-stub tuner functions when matching one of a range of load impedance values to the characteristic impedance of the main line. Fig. 4 shows a vector representation of a typical two-stub adjustment in which load impedance $Z_1$ is transformed into transmission line characteristic impedance $Z_0$ (or vice versa by following the arrows in the opposite direction. The diagram illustrates how each shunt stub causes the impedance looking into the main transmission line at the point of stub attachment to be rotated around the circle centered on the R axis and passing through the origin (a typical impedance circle diagram for a variable reactance shunting a fixed impedance). The effect of the line section S is to cause the impedance looking into the combination of the main line and the load-end stub at $Z_1$ to rotate around a standing wave impedance circle also centered on the R axis but cutting across the latter at the unique cross-over points where $$\frac{R_{min}}{Z_0}=\frac{Z_0}{R_{max}}$$

Figures 5, 5A:
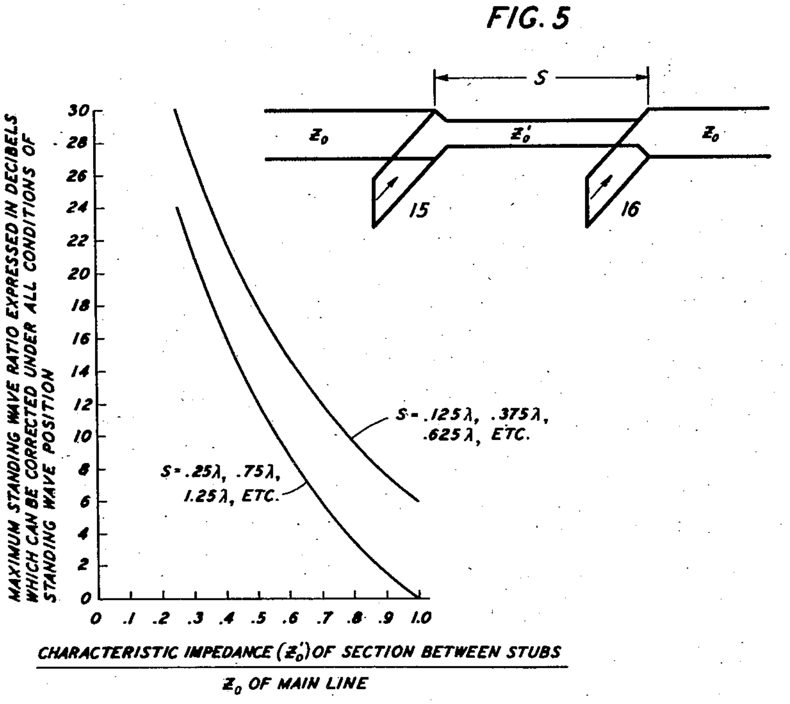
Fig. 5 shows an improved two-stub parallel wire transmission line impedance transformer.
Fig. 5A is an explanatory graph therefor.

Fig. 5 illustrates schematically a specific embodiment of the improved two-stub transmission line impedance transforming circuit (Fig. 1) for matching a wider range of load impedance to the characteristic impedance of the line. In this embodiment the two adjustable stubs 15 and 16 are spaced apart a quarter wavelength (or odd integral multiples thereof) and have a section of line "$s$" therebetween, whose characteristic impedance is 0.5 times the characteristic impedance of the main line $Z_0$. The network comprising stubs 15 and 16, shunting the ends of a series line "$s$" transforms $Z_0$, the characteristic impedance of the main line, to any impedance within an area bounded by a 12-decibel standing wave circle, without the need of the added section of transmission line D shown in Fig. 3. This network will transform the transmission line characteristic impedance $Z_0$ to certain impedances previously within the forbidden area shown in Fig. 2A. The characteristic impedance of section "$s$," should be a fraction of $Z_0$.

Fig. 2B shows the maximum standing wave expressed in decibels ($SWR_{db}=20 \log_{10} SWR$) which can be reduced to unity on the generator side of the transformer under all conditions of standing wave position on the load side (or vice versa) as a function of the stub spacing for the transformer arrangement depicted on Fig. 2. The reduction of a standing wave on the generator side to unity is accomplished only when the load impedance is "matched" to the characteristic impedance of the main line. This maximum standing wave ratio is related to the limits of the impedance range which the transformer can successfully match and is obtainable directly from an impedance graph thereof. Referring to Fig. 2A for each of the stub spacings it corresponds numerically to the respective values obtainable at the points of maximum resistance where the forbidden areas cross the R axis.

Through a similar analysis the maximum standing wave ratio which can be corrected under all conditions of standing wave position with the transformer network arrangement indicated on Figs. 1 and 5 may be derived. The results are plotted on Fig. 5A as a function of the ratio of characteristic impedance $Z_0'$ of the section of line between stubs to the characteristic impedance $Z_0$ of the main line for stub spacings corresponding to an odd integer number of quarter-wave and eighth wavelength intervals. A comparison of the matching capability (expressed as a maximum standing wave ratio in decibels which can be corrected under all conditions of standing wave position) for the arrangements of Figs. 2 and 5 may be made by comparing Figs. 2B and 5A. It will be seen for example that in the former case a stub spacing of .125 wavelength results in a maximum standing wave ratio of 6 decibels, whereas in the latter case the same stub spacings but with the interconnecting line characteristic impedance one-half that of the main line characteristic impedance results in a maximum standing wave ratio of 18 decibels, of improvement of 12 decibels. In both cases it is possible to eliminate standing waves in excess of these "limiting" values provided the position of the standing wave happens to be favorable.

What is claimed is:

1. An impedance transformer for matching a wide range of load impedances to the characteristic impedance $Z_0$ of a main coaxial line over a relatively narrow range of frequencies comprising a network formed from a pair of stub sections of a variable length adjustable to a maximum length of $$\frac{\lambda}{2}$$

said stub sections being spaced apart a fixed length $d$ such that $$d=\frac{\lambda}{4}$$

represents the maximum value of the spacing, and an intervening section of line in tandem with said main line and electrically coupled to said stub sections to provide an impedance network of distributed reactance, the characteristic impedance of said intervening line section being $\frac{1}{2}Z_0$, and movable trap pistons terminating said stubs respectively and extending $\frac{1}{4}\lambda$ distance into said stubs, where $\lambda$ is the propagated wavelength, said variation of stub length being to accommodate a variety of load impedances.

2. In combination, a pair of main coaxial transmission lines each having a characteristic impedance $Z_0$, an intervening section of line $$\frac{\lambda}{4}$$

in length connected in tandem therewith, the characteristic impedance of the intervening line section being a fraction of $Z_0$, a pair of coaxial stub lines, bridged across opposite ends of said intervening line section, the length of said stub sections being adjustable up to an effective electrical wave length equal to $$\frac{\lambda}{2}$$

where $\lambda$ is the wave length propagated over the main lines, whereby impedance transformation is provided between $Z_0$ and a wide range of terminal load impedances.

PHILLIP H. SMITH.

REFERENCES CITED

The following references are of record in the file of this patent:

UNITED STATES PATENTS

| Number | Name | Date |
|---|---|---|
| 2,041,378 | Smith | May 19, 1936 |
| 2,226,479 | Pupp | Dec. 24, 1940 |
| 2,342,254 | Dallenbach | Feb. 22, 1944 |
| 2,419,985 | Brown | May 6, 1947 |
| 2,422,160 | Woodward | June 10, 1947 |
| 2,438,912 | Hansen et al. | Apr. 6, 1948 |
| 2,446,982 | Pound | Aug. 10, 1948 |